Dec. 12, 1950     B. B. BLANCHARD     2,533,419
DRIVER ACTUATING MECHANISM FOR
FASTENING INSERTING MACHINES

Filed Nov. 22, 1947                         2 Sheets-Sheet 1

*Inventor*
Benjamin B. Blanchard
By his Attorney

Dec. 12, 1950        B. B. BLANCHARD                2,533,419
              DRIVER ACTUATING MECHANISM FOR
                 FASTENING INSERTING MACHINES
Filed Nov. 22, 1947                            2 Sheets-Sheet 2
*Fig.2*
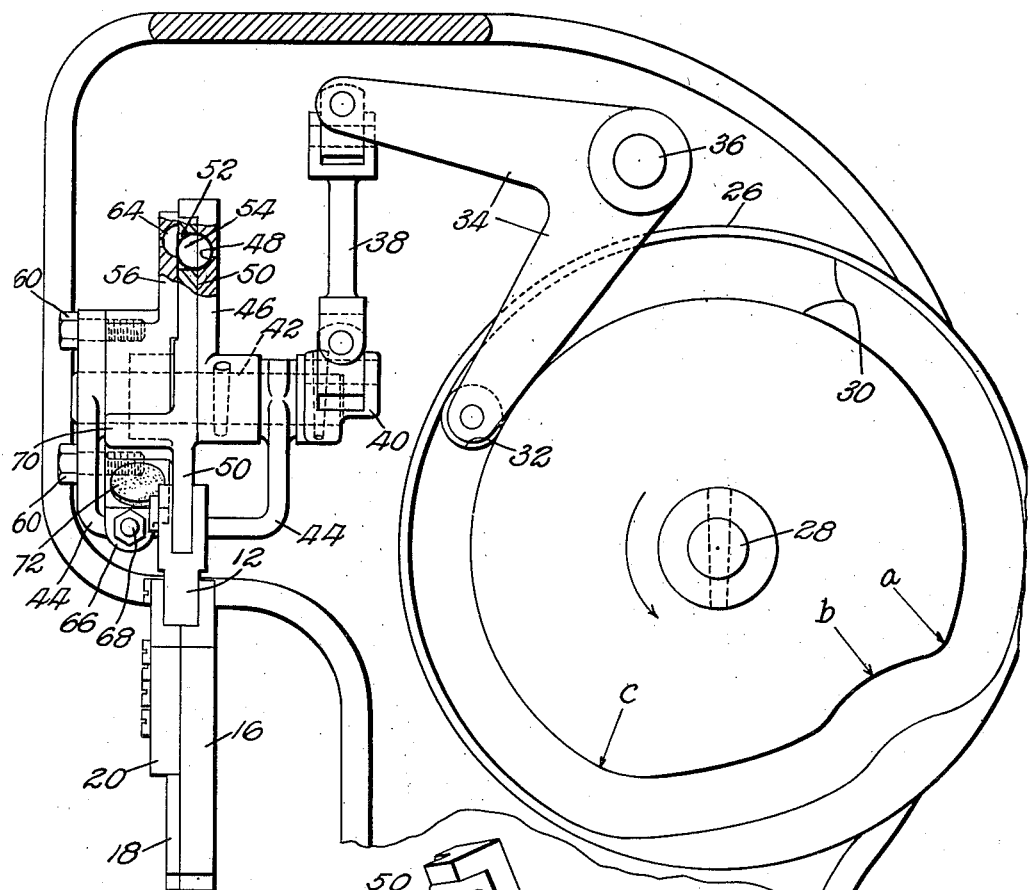
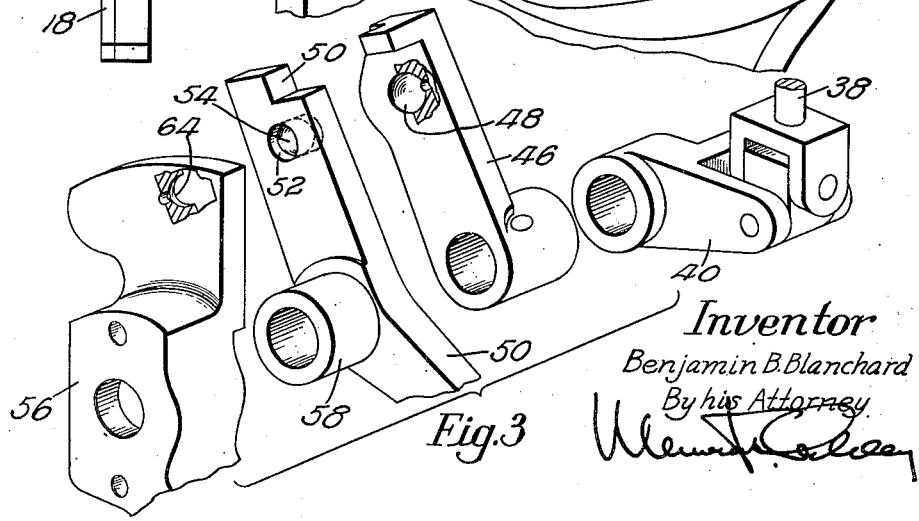
*Fig.3*
Inventor
Benjamin B. Blanchard
By his Attorney Patented Dec. 12, 1950

2,533,419

UNITED STATES PATENT OFFICE 2,533,419

DRIVER ACTUATING MECHANISM FOR FASTENING INSERTING MACHINES

Benjamin B. Blanchard, Swampscott, Mass., assignor to United Shoe Machinery Corporation, Flemington, N. J., a corporation of New Jersey Application November 22, 1947, Serial No. 787,591

6 Claims. (Cl. 1—29)

This invention relates to driver actuating mechanisms for use in fastening inserting machines. Driver actuating mechanisms in fastening inserting machines are usually either spring operated, that is to say the fastening inserting stroke of the driver is caused by the sudden release of a cocked spring, or the arrangement is such that the fastening inserting stroke of the driver is directly derived from a power operated cam.

There are certain advantages and disadvantages inherent in both mechanisms. One of the disadvantages of the cam operated driver mechanism heretofore has been the fact that it was necessary so to design the cam that the driver was retarded toward the end of its fastening inserting movement, thus to enable the driver to stop in its critical final fastening inserting position and not to move beyond that position under the momentum of the machine parts supporting and operating it. This retarding of the driver, however, may frequently result in imperfectly driven fastenings.

It is, therefore, an object of the invention to improve upon driver operating mechanisms in general, and specifically upon cam operated driver actuating mechanisms in such a way that the above-stated disadvantages no longer exist, and in particular that the full speed of the driver may be maintained to the very end of its driving stroke.

To this end and in accordance with one feature of the invention, there is provided a cam operated arm to which a nondecelerating, high speed motion is imparted by the cam and this arm is connectable to a driver operating lever by a normally rigid connection which, however, is automatically released when the driver has reached the limit of its operating stroke, the same connection furthermore serving to lock the driver operating lever to the machine frame when the connection with the cam operated arm is released and the driver has reached the end of its proper fastening inserting movement.

More specifically, the driver operating lever is provided with an aperture in which is seated a ball which may project from one side or the other of the lever. In the inoperative, elevated position of the driver, the driver operating lever is connected by this ball to the cam operated arm which to this end has a ball receiving socket in alinement with the aperture in the driver operating arm when the machine parts assume the position just mentioned. On operation of the cam operated arm the driver operating lever is swung to cause the driver to insert a fastening into the work. Simultaneously with the driver reaching the end of its operative stroke, the ball carrying aperture in the driver operating lever arrives opposite a ball receiving aperture in a fixed member and the arrangement is such that the ball, heretofore connecting together the driver operating lever and the cam operated arm, slips into the ball receiving recess in the fixed member, thus disconnecting the driver operating lever from the cam operated arm. Accordingly, the cam operated arm may continue its swinging movement without, however, further swinging the driver operating lever which, moreover, is now held stationary since it is rigidly locked to the fixed member.

It should be noted that the invention, in its broad aspects, is not necessarily limited to cam operated driver actuating mechanisms but is applicable in any sort of driver operating mechanism, including spring operated driver actuating mechanisms, so long as the driver operating member is actuated by another member having a nondecelerating, high speed motion during the operative stroke of the driver.

These and other features of the invention will now be described in detail in connection with the accompanying drawings and will be pointed out in the claims.

In the drawings,

Fig. 2 is a side elevation of the mechanism shown in Fig. 1; and

Fig. 3 is an exploded view of the mechanism for connecting the driver operating lever with its actuating means or for locking it to the machine frame.

Figure 1:
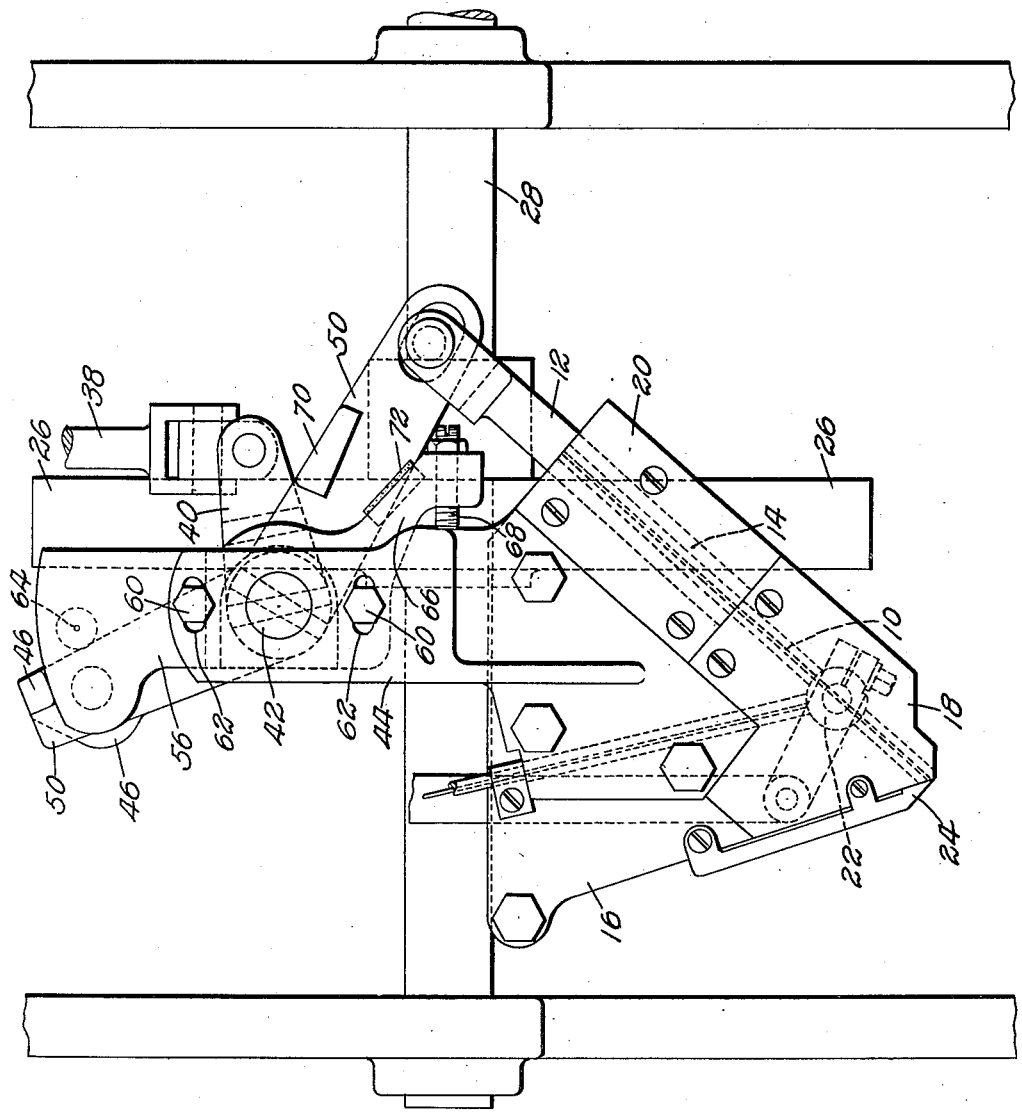
Fig. 1 is a front elevation of the driver actuating mechanism of the invention.

The invention is illustrated as embodied in a fastening inserting machine of the type disclosed in Letters Patent of the United States, No. 2,430,515 issued November 11, 1947, on an application filed in the name of Robert H. Lawson. Only so much of the machine disclosed in that patent will be referred to herein as is necessary for an understanding of the present invention.

In the fastening inserting machine of the above-identified Lawson patent, the driver is operated by torsion springs which, at a predetermined time in a cycle of operations, are loaded and held cocked in readiness to be released to operate the driver. It is contemplated, however, to substitute herein for a driver actuating mechanism of this type a driver operating mechanism in which the operative stroke of the driver is derived directly from a cam.

As in the above-mentioned prior machine, the machine of the present invention has a thin driver 10 (Fig. 1) which is secured to a reciprocating driver bar 12. The driver 10 is movable in a guideway provided in a guide member 14 which is held in a bracket 16 secured to the machine frame. The guide member 14 and in part the bracket 16 are covered over by cover plates 18 and 20. Moreover, there is provided in the bracket 16 a rotatable wire severing roll 22 having a diametrically arranged wire receiving passage into which the wire is fed by a wire feeding mechanism (not shown). After having received an extent of wire, the roll 22 is rotated to sever that extent of the wire from the wire strand and to present it in the line of inserting movement of the driver 10. The fastening, in this case a straight piece of wire, in being driven out of the machine is bent by a deflector or baffle plate 24 which causes the fastening to become curled and enter the work in a curved path without penetrating its full thickness.

The illustrated driver operating mechanism is actuated by a cam disk 26 (Fig. 2) secured to a cam shaft 28 which is rotatably mounted in the machine frame in the direction indicated by the arrow and is power operated in a manner described in the above-mentioned Lawson patent. The cam disk 26 is provided with a closed cam track 30 in which runs a cam roll 32 carried by a cam lever 34. The cam lever is in the form of a bell crank lever and is pivotally secured on a pivot shaft 36 mounted in the machine frame. The forwardly extending arm of the bell crank lever 34 is pivotally connected by means of a connecting rod 38 to an arm 40 (Fig. 3) which is pinned to a rockshaft 42 (Figs. 1 and 2) rotatably mounted in bearings provided in a U-shaped bracket 44 secured to the machine frame. Pinned to the shaft 42 is another upwardly extending arm 46 which is provided with a ball receiving socket 48. A driver operating lever 50 is mounted to swing loosely on the shaft 42 and is located in close relation to the arm 46. The downwardly extending arm of the lever 50 is pivotally secured to the upper end of the driver bar 12.

In the inoperative position of these parts and, more specifically, when the driver 10 is in its elevated retracted position, the ball receiving socket 48 of the cam-operated arm 46 is located opposite to, and in register with, an aperture 52 provided in the driver operating lever 50. Seated in the aperture 52 is a coupling ball 54 which fits closely therein but is movable therein. The ball 54 is of a diameter somewhat in excess of the thickness of the lever 50 so that it may protrude from one side or the other of the lever 50 or simultaneously from both sides. In the just-mentioned inoperative position of the machine parts, the ball 54 is partly received in the socket 48 (which socket has a depth less than the radius of the ball 54) of the arm 46 and partly in the aperture 52 of the lever 50, thus locking the lever 50 to the cam operated arm 46. The ball 54, in this position of the machine parts, cannot escape from the other side of the lever 50 and thus is held in locking position since there is located in close relation to the lever 50 a bracket 56, a face plate portion of which closes the end of the aperture 52 nearest to it and forces the ball into the socket 48. The bracket 56 is hollowed out to provide a bearing for the reception of the hub 58 of the lever 50.

The bracket 56 also is rotatably mounted on the shaft 42 and is adjustable about that shaft. However, the bracket 56 is normally held in its adjusted position by clamping bolts 60 (Figs. 1 and 2) which extend through slots 62 provided in a portion of the U-shaped bracket 44 and which are threaded into the bracket 56. Thus the bracket 56 is normally fixed in the machine and may be considered a part of the machine frame. The face of the bracket 56, as illustrated best in Fig. 3, is provided with a ball receiving socket 64 which is so located and the position of which may be so adjusted upon adjustment of bracket 56 about the shaft 44 that upon completion of a predetermined extent of movement by the driver operating lever 50 the aperture 52 of that lever arrives opposite to and in alinement with the socket 64 of the bracket 56. The socket 64 has a depth less than the radius of the ball 54. The ball 54 now can slip out of the socket 48 of the cam operated arm 46 due to action of the wall of the socket 48 on the ball 54 and enter the socket 64 of the bracket 56. This causes the driver operating lever 50 to become released or disengaged from the cam operated arm 46 and to become locked to the fixed bracket 56, the ball 54 being held in this locking position by a plane portion of the arm 46 adjacent to the socket 48. Thus, any "overdrive" on the part of the cam operated arm 46 beyond the position in which the driver has reached the end of its fastening inserting movement will not cause continued movement of the driver operating lever 50 and the driver 10.

After the release of the lever 50 from the arm 46, should the latter continue its motion to a certain extent, the socket 48 will be moved out of alinement with the aperture 52 in the lever 50. The right hand end of the aperture 52 (as seen in Fig. 2) is thus closed by the arm 46, forcing the ball 54 into the socket 64 and causing the lever 50 to be firmly locked to the bracket 56.

On return of the arm 46 into initial inoperative position its socket 48 is again alined with the aperture 52 of the lever 50, thus permitting the ball 54 to enter the socket 48 under the action of walls of the socket 64 on the ball and to lock the lever 50 to the arm 46. Accordingly, the lever 50 also is returned to its inoperative position. Escape of the coupling ball 54 to the left in the aperture 52 is prevented by the face of the bracket 56 as soon as the aperture 52 is again moved out of alinement with the socket 64 of the bracket 56.

For the purpose of adjusting the bracket 56 about the shaft 42 the bracket is provided with a downwardly extending projection 66 (Fig. 1) through which is threaded a set screw 68 bearing against the fixed U-shaped bracket 44. After loosening the clamping bolts 60 the set screw 68 may be turned (after its own locking nut has been backed off) so as to adjust the bracket 56 within certain limits as determined by the extent of the slots 62.

To prevent any jarring of the machine parts when the driver operating lever 50 is suddenly caused to terminate its operating movement, that lever is provided with a lateral projection 70 (Figs. 1 and 2) which acts as a striker and which, when the lever 50 reaches the end of its operating stroke, engages a pad or bumper 72 secured to the projection 66 of the bracket 56.

Referring more specifically to the configuration of the closed cam track 30 of the cam disk 26, it should be noted that it is so designed that during the operative stroke of the driver 10 (see a—b in Fig. 2) the swinging movement of the cam lever 34 and the operation of the mechanism actuated by it is nowise decelerated. On the contrary, full speed is maintained to the very end so that the driver 10 is capable of fully inserting the fastening and clinching it within the work as is desired. This may be accomplished in accordance with the invention without, however, causing the driver to move beyond its lowermost critical position. The return movement of the driver 10 into initial position is controlled by the cam track portion b—c in Fig. 2.

Having thus described my invention, what I claim as new and desire to secure by Letters Patent of the United States is:

1. In a fastening inserting machine having a frame, a power operated cam rotatably mounted in the frame, an arm to which a high speed motion is imparted by the cam, a fastening inserting driver, a driver operating lever, a ball movably supported in the lever, a socket in the arm adapted to be engaged by the ball to lock the lever to the arm, and a socket in the frame opposite which latter socket the ball is located when the driver is at the end of its operative stroke and into which the ball is adapted to slip to disconnect the lever from the arm and to connect the lever with the frame.

2. In a fastening inserting machine having a frame, a power operated cam rotatably mounted in the frame, an arm to which a high speed motion is imparted by the cam, a fastening inserting driver, a driver operating lever, a ball movably supported in the lever, a socket in the arm adapted to be engaged by the ball to lock the lever to the arm, a recessed locking member normally secured to the frame, the recess of which is located in alinement with the ball when the driver is at the end of its operative stroke and into which recess the ball is adapted to slip to disconnect the lever from the arm and to connect the lever with the locking member, and means for adjusting the locking member with relation to the frame.

3. In a fastening-inserting machine having a frame, a power-operated cam rotatably mounted in the frame, a fastening-inserting driver, a movable driver-operating member having two parallel side portions and a transverse aperture extending between said side portions, a shiftable coupling member supported in the aperture, a relatively stationary face plate positioned on the frame contiguous to one of said side portions, a cam-operated member to which a high speed back-and-forth movement is imparted mounted contiguous to the other of said side portions, a socket in the cam-operated member adapted normally to be engaged by the coupling member to connect the driver-operating member to the cam-operated member for imparting an operating stroke to the driver, and a socket in the face plate located in alinement with the coupling member when the driver is at the end of its operative stroke and into which socket the coupling member is adapted to shift to disconnect the driver-operating member from the cam-operated member and to connect the driver-operating member with the face plate.

4. In a fastening-inserting machine having a frame, a power-operated cam rotatably mounted in the frame, a fastening-inserting driver, a movable driver-operating member having two parallel side portions and a transverse aperture extending between said side portions, a shiftable coupling member supported in the aperture, a relatively stationary face plate positioned on the frame contiguous to one of said side portions, a cam-operated member to which a high speed back-and-forth movement is imparted mounted contiguous to the other of said side portions, a socket in the cam-operated member adapted normally to be engaged by the coupling member to connect the driver-operating member to the cam-operated member for imparting an operating stroke to the driver, a socket in the face plate located in alinement with the coupling member when the driver is at the end of its operative stroke and into which socket the coupling member is adapted to shift to disconnect the driver-operating member from the cam-operated member and to connect the driver-operating member with the face plate, and means for adjusting the face plate socket with relation to the frame to determine the extent of the operating stroke of the driver.

5. In a fastening-inserting machine having a frame, a power-operated cam rotatably mounted in the frame, a relatively stationary face plate positioned on the frame, a fastening-inserting driver, a movable driver-operating lever having two parallel side portions one of which is located contiguous to said plate, the lever being provided with a transverse aperture extending between said side portions, a cam-operated member to which a high speed back-and-forth movement is imparted, said member being mounted contiguous to the other one of said lever side portions opposite from the face plate, a shiftable coupling member carried by the lever and supported in the aperture, a socket in the cam-operated member adapted normally to be engaged by said coupling member to connect the lever to the cam-operated member for imparting an operating stroke to the driver, and a socket in the face plate into which socket the coupling member is adapted to shift to disconnect the driver-operating member from the cam-operated member when the driver is at the end of its operative stroke whereby a high speed motion is imparted to the lever during the stroke of the driver and, when the driver is at the end of its operative stroke, the lever is held stationary.

6. In a fastening-inserting machine having a frame, a fastening-inserting driver, a relatively stationary face plate positioned on the frame, a movable driver-operating lever having two parallel side portions one of which is located contiguous to said plate, a power-actuated member to which a high speed back-and-forth movement is imparted, said member being mounted contiguous to the other one of said lever side portions opposite from said face plate, and a member carried by the driver-operating lever and movable to connect said driver-operating lever alternately with said power-actuated member and said face plate.

BENJAMIN B. BLANCHARD.

REFERENCES CITED

The following references are of record in the file of this patent:

UNITED STATES PATENTS

| Number | Name | Date |
| --- | --- | --- |
| 1,755,225 | Paxton | Apr. 22, 1930 |
| 2,135,650 | Twomley | Nov. 8, 1938 |